US009942256B2

(12) United States Patent
Komárek et al.

(10) Patent No.: US 9,942,256 B2
(45) Date of Patent: *Apr. 10, 2018

(54) DETECTING NETWORK ADDRESS TRANSLATION DEVICES IN A NETWORK BASED ON NETWORK TRAFFIC LOGS

(71) Applicant: Cisco Technology, Inc., San Jose, CA (US)

(72) Inventors: Tomáš Komárek, Frýdek-Místek (CZ); Martin Grill, Praha (CZ); Tomáš Pevný, Praha (CZ)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,683

(22) Filed: Apr. 25, 2017

(65) Prior Publication Data

US 2017/0230395 A1      Aug. 10, 2017

Related U.S. Application Data

(63) Continuation of application No. 14/696,947, filed on Apr. 27, 2015, now Pat. No. 9,667,636.

(51) Int. Cl.
*H04L 29/06* (2006.01)
*G06N 99/00* (2010.01)

(52) U.S. Cl.
CPC ....... *H04L 63/1425* (2013.01); *G06N 99/005* (2013.01)

(58) Field of Classification Search
CPC . H04L 63/1408; H04L 61/256; G06N 99/005; G06F 17/30185; G06F 17/30979
See application file for complete search history.

(56) References Cited

U.S. PATENT DOCUMENTS

| 7,243,141 | B2 | 7/2007 | Harris |
| 8,370,937 | B2 | 2/2013 | Gal et al. |
| 2004/0131059 | A1* | 7/2004 | Ayyakad ................. H04L 45/60 370/389 |

(Continued)

OTHER PUBLICATIONS

Michael Zalewski "p0f v3 (version 3.08b)", copyright 2012-2014, 3 pages.

(Continued)

*Primary Examiner* — Mahfuzur Rahman
(74) *Attorney, Agent, or Firm* — Edell, Shapiro & Finnan, LLC

(57) ABSTRACT

Actual traffic logs of network traffic to and from host devices in a network are collected over time. Artificial traffic logs for each of multiple artificial network address translation (NAT) devices are generated from the actual traffic logs. The actual traffic logs and the artificial traffic logs are labeled as being indicative of non-NAT devices and NAT devices, respectively, to produce labeled traffic logs. From the labeled traffic logs for each artificial NAT device and each non-NAT device, respective, correspondingly labeled, network traffic features indicative of whether the device behaves like a NAT device or a non-NAT device are extracted. A classifier device is trained using the network traffic features extracted for each artificial NAT device and each non-NAT device to classify between an actual NAT device and an actual non-NAT device based on further actual traffic logs.

20 Claims, 9 Drawing Sheets

(56) References Cited

U.S. PATENT DOCUMENTS

| | | | |
|---|---|---|---|
| 2005/0198412 A1* | 9/2005 | Pedersen | H04L 63/0428 710/30 |
| 2007/0162968 A1 | 7/2007 | Ferreira et al. | |
| 2009/0144806 A1 | 6/2009 | Gal et al. | |
| 2012/0201137 A1* | 8/2012 | Le Faucheur | H04W 28/0226 370/235 |
| 2015/0113110 A1 | 4/2015 | Shimakawa | |
| 2016/0006690 A1 | 1/2016 | Ho | |

OTHER PUBLICATIONS

Tadayoshi Kohno et al. "Remote physical device fingerprint", Proceedings of the 2005 IEEE Symposium on Security and Privacy (S&P'05), IEEE Computer Society, 15 pages.

Li Rui et al. "Remote NAT detect Algorithm Based on Support Vector Machine", 2009 IEEE, 4 pages.

Nino Vincenzo Verde et al. "No NAT'd User left Behind": Fingerprinting Users behind NAT from NetFlow Records alone, University of Rome, Department of Computer Science, 11 pages.

Vojtech Krmicek et al. "NetFlow Based System for NAT Detection", CoNEXT Student Workshop '09, Dec. 1, 2009, Rome, Italy, ACM 978-1-60558-751-6/09/12, 2 pages.

Gregor Maier et al. "NAT Usage in Residential Broadband Networks", N. Spring and G. Riley (Eds.): PAM 2011, LNCS 6579, pp. 32-41, 2011, 10 pages.

Peter Phaal "Detecting NAT Devices using sFlow", sFlow.org, 3 pages.

Sophon Mongkolluksamee et al. "Counting NATed Hosts by Observing TCP/IP Field Behaviors", IEEE ICC 2012—Communication QoS, Reliability and Modeling Symposium, 6 pages.

Steven M Bellovin "A Technique for Counting NATed Hosts", AT&T Labs Research, 6 pages.

Robert Beverly "A Robust Classifier for Passive TCP/IP Fingerprinting", MIT Computer Science and Artificial Intelligence Laboratory, 11 pages.

Li Rui et al. "Passive NATted Hosts Detect Algorithm Based on Directed Acyclic Graph Support Vector Machine", 2009 International Conference on Multimedia Information Networking and Security, IEEE Computer Society, 4 pages.

* cited by examiner

HTTP LOGS 400

| | timestamp | sc-http-status | sc-bytes | sc-content-bytes | cs-bytes | cs-content-bytes | cs-method | cs-url | x-elapsed-time |
|---|---|---|---|---|---|---|---|---|---|
| R1→ | 1424851268 | 200 | 579 | 1220 | 120 | 0 | GET | URL1 | 20 |
| R2→ | 1424851268 | 200 | 256 | 3456 | 149 | 0 | GET | URL2 | 190 |
| R3→ | 1424851268 | 200 | 579 | 5909 | 136 | 0 | GET | URL3 | 19 |
| R4→ | 1424851268 | 200 | 374 | 3118 | 165 | 0 | GET | URL4 | 189 |
| R5→ | 1424851308 | 200 | 750 | 616 | 207 | 0 | GET | URL5 | 19 |

405 → cs-url column (URL1–URL5) { 415 }

| | s-ip | s-port | c-ip | c-port | cs-mime-type | cs(Referer) | cs(User-Agent) |
|---|---|---|---|---|---|---|---|
| R1 (cont'd) | 198.35.26.112 | 80 | 10.148.144.124 | 40003 | text/html; charset=UTF-8 | - | UA1 |
| R2 (cont'd) | 204.79.197.200 | 80 | 10.148.144.124 | 40475 | image/jpeg | CS1 — 418 | UA2 |
| R3 (cont'd) | 173.194.40.121 | 80 | 10.148.144.124 | 40005 | text/html; charset=UTF-8 | - | UA3 |
| R4 (cont'd) | 23.14.92.64 | 80 | 10.148.144.124 | 40477 | text/html; charset=UTF-8 | - | UA4 |
| R5 (cont'd) | 46.228.47.114 | 80 | 10.148.144.124 | 56497 | text/html; charset=UTF-8 | - | UA5 |

410 → cs(User-Agent) column (UA1–UA5) { 420 }

415 {
URL1 = http://en.wikipedia.org/wiki/Network_address_translation
URL2 = ts4.mm.bing.net/th?q=SQL+Server+Technology&w=35&h=35&c=1&qlt=90&pid=InlineBlock&mkt=en-GB&adlt=moderate&t=1
URL3 = http://www.nytimes.com/;   URL4 = https://www.facebook.com/?_rdr;   URL5 = https://www.yahoo.com/
}

418 — CS1 = http://www.bing.com/images/search?q=proxy+server&FORM=HDRSC2

420 {
UA1 = Mozilla/5.0 (X11; Linux x86_64) AppleWebKit/537.36 (KHTML, like Gecko) Ubuntu Chromium/37.0.2062.120 Chrome/37.0.2062.120 Safari/537.36
UA2 = Mozilla/5.0 (X11; Linux x86_64) AppleWebKit/537.36 (KHTML, like Gecko) Ubuntu Chromium/37.0.2062.120 Chrome/37.0.2062.120 Safari/537.36
UA3 = Mozilla/5.0 (Windows NT 6.3; rv:36.0) Gecko/20100101 Firefox/36.0
UA4 = Mozilla/5.0 (compatible; MSIE 11, Windows NT 6.3; Trident/7.0; rv:11.0) like Gecko
UA5 = Opera/9.80 (X11; Linux i686; Ubuntu/14.10) Presto/2.12.388 Version/12.16
}

FIG. 4

BEHAVIORAL FEATURE SETS 500

| CONTACTED IPs | USER-AGENTS | OS NAMES | PERSISTENT CONNECTIONS | BROWSER VERSIONS | UPLOADED BYTES | DOWNLOADED BYTES | FLOWS |
|---|---|---|---|---|---|---|---|
| 198 | 12 | 2 | 7 | 3 | 920087 | 35854307 | 1087 |
| 122 | 9 | 2 | 14 | 2 | 12377611 | 90231013 | 1294 |
| 739 | 8 | 2 | 7 | 3 | 15105118 | 235429342 | 1442 |
| 200 | 9 | 2 | 14 | 2 | 12377611 | 90231013 | 1294 |

FIG.5

DETECTING NETWORK ADDRESS TRANSLATION DEVICES IN A NETWORK BASED ON NETWORK TRAFFIC LOGS

CROSS-REFERENCE TO RELATED APPLICATION

This application is a continuation application of U.S. Non-Provisional Application No. 14/696,947, filed on Apr. 27, 2015, the entirety of which is incorporated herein by reference.

TECHNICAL FIELD

The present disclosure relates to training a classifier device to detect network address translation (NAT) devices in a network.

BACKGROUND

Network Address Translation (NAT) involves translating between Internet Protocol (IP) address spaces in a communication network so as to overcome a deficit of IP addresses for other devices connected to the network, provide anonymity, filter content, monitor network performance and/or share connectivity with the other devices in the network. Unauthorized NAT devices or NAT software in the network represent a significant network security threat because they may provide unrestricted access to the other network-connected devices or data. Wireless NATs (e.g., Wi-Fi® NAT devices) pose a particular security risk because they may allow unauthorized access to the network from considerable distances without wired connections. It is also important for network behavior analysis systems to be able to detect NAT devices. Accordingly, detecting and distinguishing between unauthorized and authorized NAT devices and NAT software is important for purposes of network security and behavior analysis.

BRIEF DESCRIPTION OF THE DRAWINGS

FIG. 4 is an illustration of example Hypertext Transfer Protocol (HTTP) logs from which information used to detect NAT devices may be extracted, according to an example embodiment.

FIG. 5 is an example table of host device behavioral features and their respective feature values extracted from HTTP logs, according to an example embodiment.

DESCRIPTION OF EXAMPLE EMBODIMENTS

Overview

Actual traffic logs of network traffic to and from host devices in a network are collected over time. Artificial traffic logs for each of multiple artificial network address translation (NAT) devices are generated from the actual traffic logs. The actual traffic logs and the artificial traffic logs are labeled as being indicative of non-NAT devices that do not perform NAT and NAT devices, respectively, to produce labeled traffic logs. From the labeled traffic logs for each artificial NAT device and each non-NAT device, respective, correspondingly labeled, network traffic features indicative of whether the device behaves like a NAT device or a non-NAT device are extracted. A classifier device is trained using the respective, correspondingly labeled, network traffic features extracted for each artificial NAT device and each non-NAT device to classify between an actual NAT device and an actual non-NAT device based on further actual traffic logs.

Example Embodiments

Figure 1:
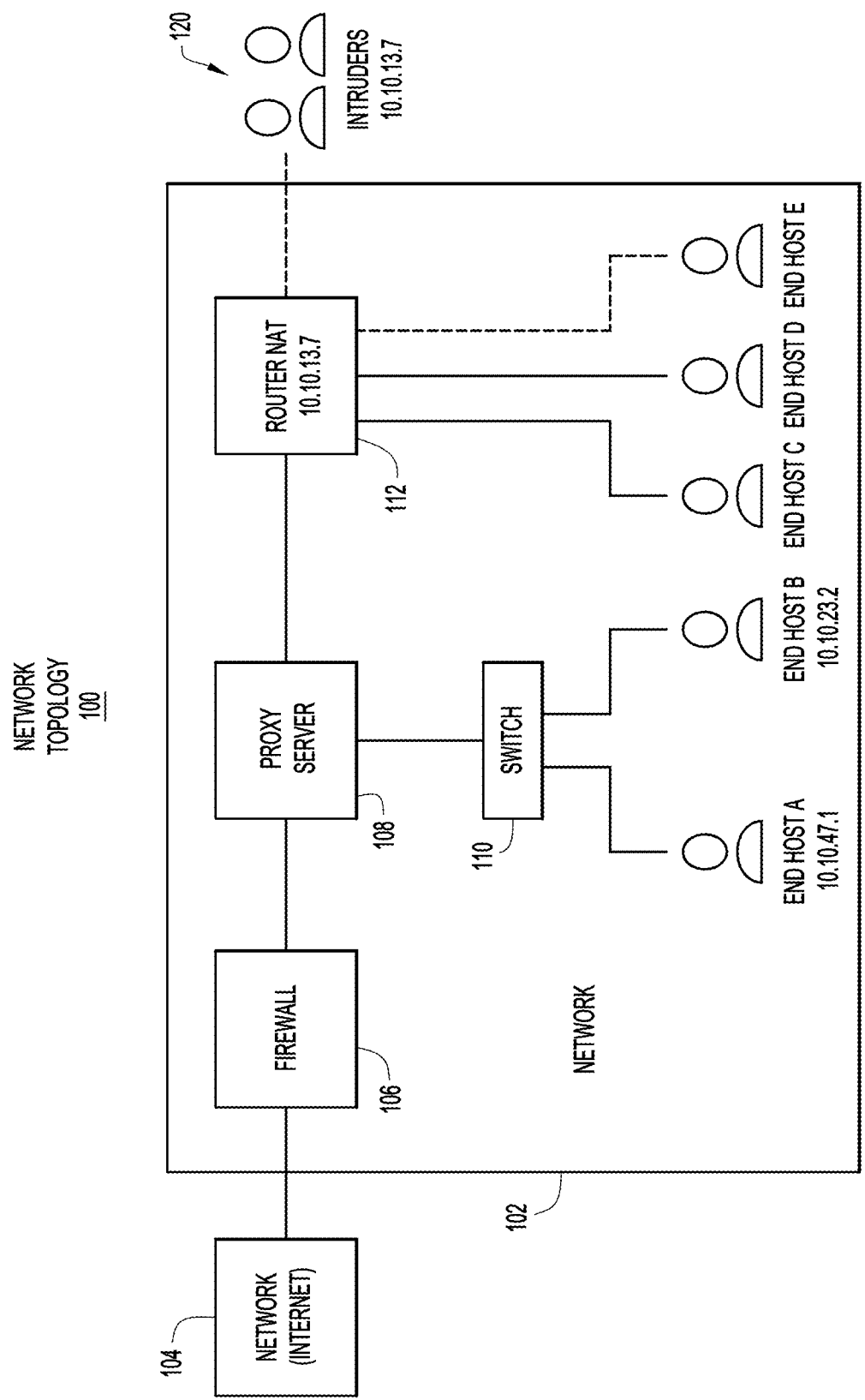
FIG. 1 is a block diagram of a network environment in which embodiments used to detect Network Address Translation (NAT) devices may be implemented, according to an example embodiment.

Referring first to FIG. 1, there is shown a block diagram of an example network environment 100 in which embodiments used to detect Network Address Translation (NAT) devices may be implemented. Network environment 100 includes a first communication network 102 such as one or more local area networks (LANs), virtual LANs (VLANs), and virtual extended LANs (VxLANs) to communicate with a second communication network 104, which may include a wide area network (WAN) such as the Internet in addition to one or more LANs. Network 102 includes a firewall 106 connected with a proxy server device 108 (referred to simply as a "proxy server" 108) to serve as a focal point for network traffic to/from network 102 from/to network 104 through the firewall. Network 102 also includes a network switch 110 and a NAT enabled router 112 (referred to as a "NAT device" 112) both connected to proxy server 108.

Network 102 also includes host devices A and B connected with network switch 110 and host devices C, D, and E connected with NAT device 112. Host devices A-E may include server devices and/or client devices that execute applications and provide access to network 102 for users of the host devices A-E. Host devices A-E are each referred to as an "end" host device for reasons that will become apparent from the description below. Network traffic, e.g., Internet Protocol (IP) packets, to/from host devices A-E circulate within network 102 and pass to and from network 104 via network switch 110, NAT device 112, and proxy server 108. One or more intruder devices 120 may attempt an unauthorized access into network 102 through NAT device 112 or any other entry point into network 102. Network 102 is an example only and many different network topologies may be used with embodiments described herein. Dotted lines in FIG. 1 indicate example wireless links or connections while solid lines indicate example wired links.

An IP address is typically assigned to each device in network 102 (e.g., each of host devices A-E, proxy server 108, and NAT device 112), and each device may be identified by, or said to be associated with, its assigned IP address as indicated, for example, in IP packets flowing to and from the device. Each device may also be identified by a respective device name (such as an alphanumeric name) assigned to that device as also indicated in the IP packets.

NAT device 112 translates or maps the IP addresses in IP packets traversing the NAT device between a private IP address space for the devices in network 102 and a public IP address space exposed to network 104. As such, NAT device 112 modifies source and destination IP addresses in IP packets from the devices in network 102 destined for network 104 and from network 104 destined for the devices in network 102. As used herein, the term "NAT device" means any entity or instance that performs NAT, such as any physical device or hardware, virtual device or virtual machine, computer/software application, or service, such as a cloud based service, configured to perform NAT.

Proxy server 108 acts an intermediary or focal point for network traffic in the form of client-server transactions between "client" devices in network 102 (e.g., host devices A-E, network switch 110, and so on) and "server" devices in network 104. In such transactions, devices in network 102 act as clients that send requests to devices in network 104 through proxy server 108, and the devices in network 104 act as servers that send responses to the appropriate requesting clients through the proxy server 108. Proxy server 108 may also serve as a focal point for network traffic circulating between the devices in network 102. Thus, proxy server 108 has a comprehensive view of network traffic to and from the other devices in network 102 and monitors that network traffic.

Figure 2:
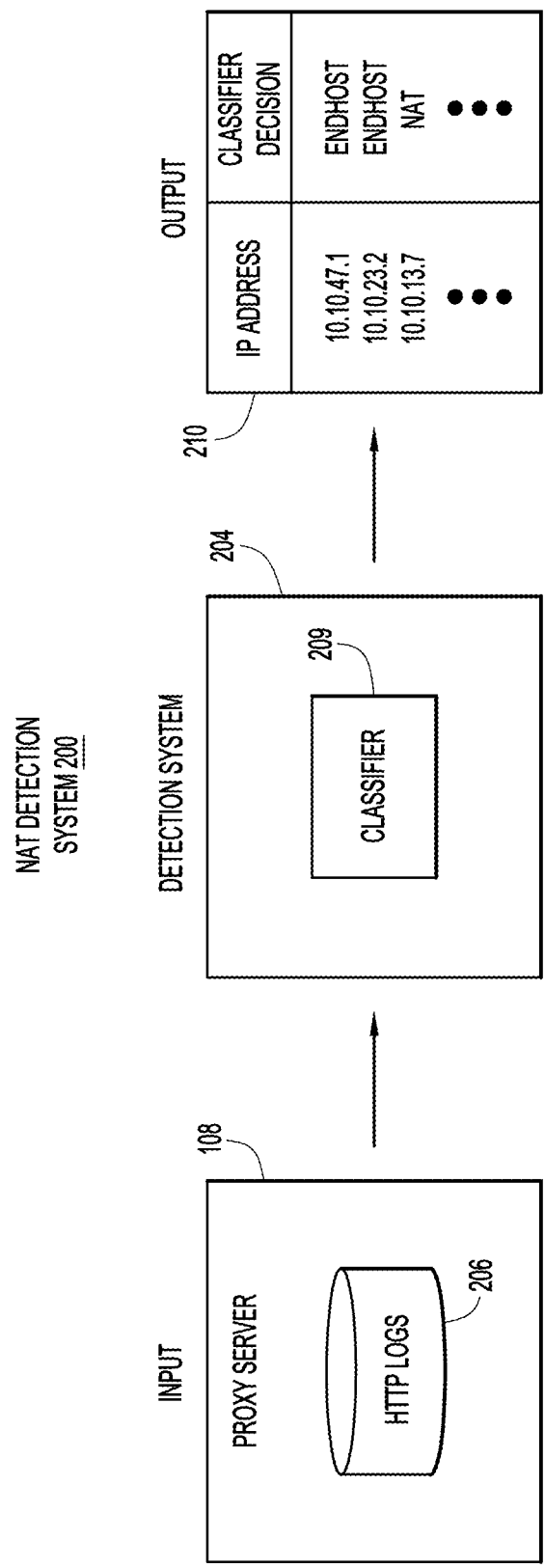
FIG. 2 is an illustration of a high-level block diagram of a system to detect NAT devices, according to an example embodiment.

With reference to FIG. 2, there is an illustration of a high-level system 200 for detecting NAT devices (e.g., NAT device 112) and/or proxy servers (e.g., proxy server 108) in network 102, according to an embodiment. System 200 includes proxy server 108 and a NAT detector 204. NAT detector 204 may reside on, or be part of, any device in network 102, or may be a stand-alone device that can access proxy server 108. Proxy server 108 captures network traffic logs 206 of network traffic flowing to and from the devices in network 102 over a period time, stores the logs, and makes them available to NAT detector 204. This process is referred to as "logging network traffic" to produce network traffic logs. In an embodiment, proxy server 108 captures Hypertext Transfer Protocol (HTTP) proxy logs (also referred to simply as "HTTP logs") associated with IP packets to and from the other network devices in network 102. The HTTP proxy logs include information in HTTP headers for IP packets, including, but not limited to, IP addresses and device names, URLs, User-Agent strings, and the like.

Initially, each entity identified in the network traffic logs by IP address or device name is regarded as a generic "host device" that may be either a NAT device that performs NAT, or a end host device that does not perform NAT. A "host device" may be any physical device or hardware, virtual device or virtual machine, computer/software application, or service, such as a cloud based service, identifiable in the network traffic logs. A host device that performs NAT is a NAT device (as mentioned above), while a host device that does not perform NAT is an "end host device" or a "non-NAT" device. An "end host device"/"non-NAT device" may be any physical device or hardware, virtual device or virtual machine, computer/software application, or service, such as a cloud based service, which does not perform NAT.

The behavior of a NAT device actually includes a mixture of behaviors of individual devices, such as end host devices (i.e., not NAT devices) connected to the NAT device as well as behavior specific to the NAT device. Accordingly, NAT detector 204 recognizes this mixture of behaviors as exhibited in the captured HTTP logs to detect the NAT device, as described below. Accordingly, NAT detector 204 accesses captured HTTP logs 206 and derives information from the logs indicative of whether each host device identified in the logs (e.g., each host device in network 102) exhibits the behavior of a NAT device or an end host device (i.e., non-NAT device).

NAT detector 204 includes a host device behavior classifier 209 that has been trained in an a priori training phase to classify each host device identified in network traffic logs 206 as either a NAT device or an end host device that does not host a NAT application, based on the information derived from network traffic logs. Thus, trained classifier 209 classifies each device in network 102 as either a NAT device or an end host device based on the information derived from the network traffic logs and outputs classifier results 210. The operation of classifying is also considered one of detecting NAT devices and end host devices in network 102. In the examples of FIGS. 1 and 2, classifier results 210 indicate that host devices A, B having IP addresses 10.10.47.1, 10.10.23.2 are end host devices (non-NAT devices) and router 112 having IP address 10.10.13.7 is a NAT device.

Figure 3:
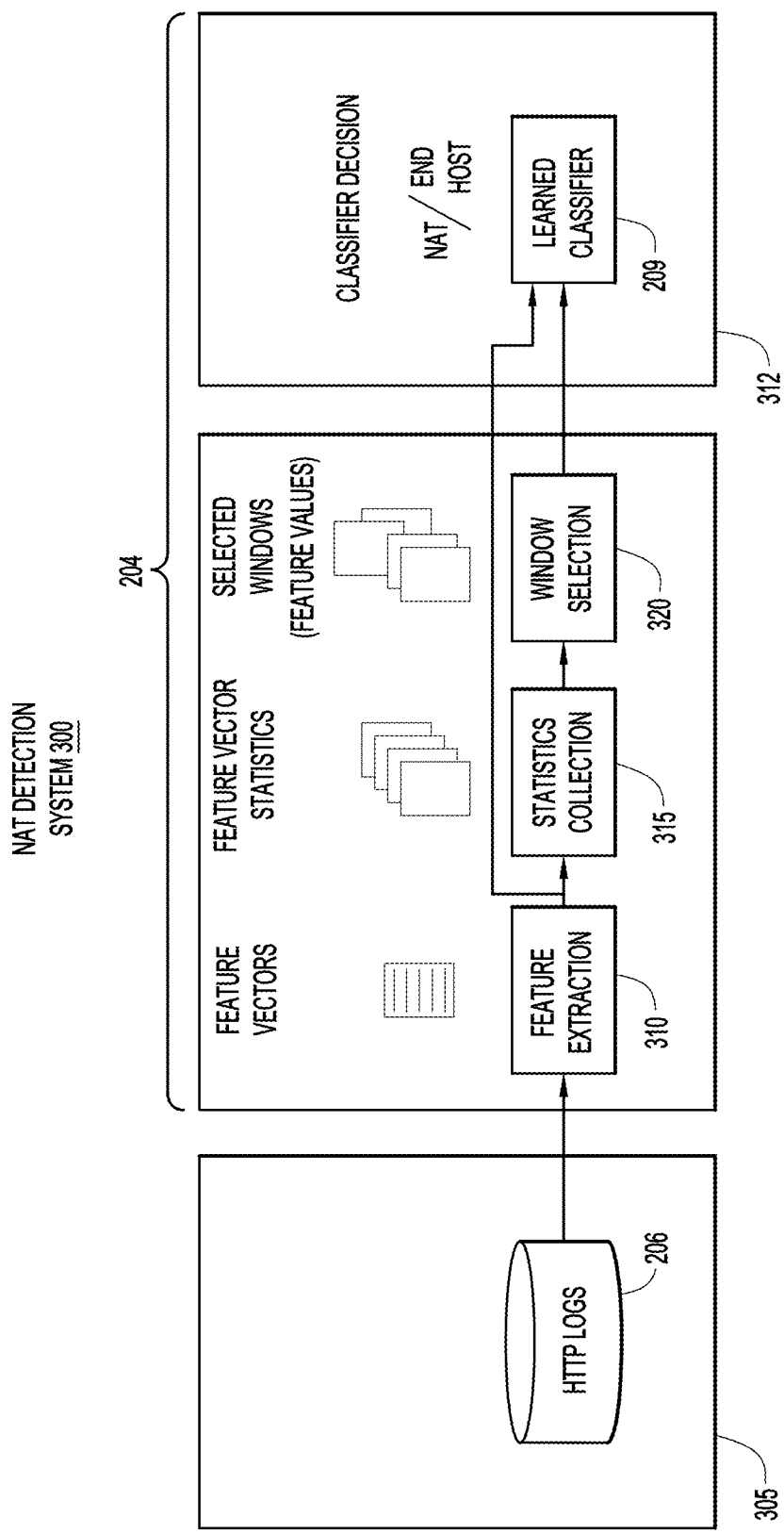
FIG. 3 is a flowchart of a method of detecting NAT devices, according to an example embodiment.

With reference to FIG. 3 there is a flowchart of an example method 300 of detecting NAT devices in network 102 performed by NAT detector 204 based on network traffic logs 206 collected by proxy server 108. Method 300 is performed after the a priori training phase of classifier 209 in which the classifier has been trained to classify devices in a network as either NAT devices or end host devices based on certain information derived from known network traffic logs (which may be from network 102 or other networks), as will be described below. Method 300 may also be used to detect proxy servers in network 102.

At 305, proxy server 108 logs network traffic to and from the host devices in/connected to network 102 over time to produce network traffic logs 206, as mentioned above. In an example, proxy server 108 collects HTTP logs in consecutive non-overlapping time windows spanning multiple hours to produce respective HTTP logs in each time window. In an example, proxy server 108 collects HTTP logs in consecutive, non-overlapping, 30 minute time windows spanning 24 hours. Other time window periods and spanning durations may be used.

With reference to FIG. 4, there is an illustration of an example table of HTTP logs 400 captured by proxy server 108. Table of HTTP logs 400 includes (i) rows R1-R5 each representing an HTTP log for a client-server (c-s) network transaction, and (ii) multiple columns to record various types of information about the network transaction for each log. Typical HTTP logs may include many more than the five rows shown in the example of FIG. 5. For illustrative convenience, HTTP log table 400 is divided between a first table portion 405 having a first set of columns "TIMESTAMP" through "ELAPSED TIME" and a second table portion 410 having a second set of columns "S-IP" through "CS(USER-AGENT)." The "User-Agent" string typically identifies the client software running on the host device that originated a client-server request. In table 400, prefixes "S" and "C" are abbreviations for "server" and "client," respectively. For instance, "SC-BYTES" means "server to client bytes" for downloaded bytes. Conversely, "CS-BYTES" means "client to server bytes" for uploaded bytes.

First table potion 405 includes columns to record (1) a TIMESTAMP for each c-s transaction or log, (2) HTTP STATUS code, (3) SC-BYTES to indicate a number of bytes transferred in an SC transaction packet, (4) SC-CONTENT BYTES to indicate a number of content bytes in an SC transaction packet (as opposed to total header and content bytes), (5) CS-BYTES to indicate a number of bytes in a CS transaction packet, (6) CS-CONTENT BYTES to indicate a number of content bytes in a CS transaction packet, (7) CS-METHOD to indicate an HTTP method used for the transaction, (8) CS-URL to indicate the access URL for the transaction (e.g., see URL1-URLS shown in expanded form at the bottom of FIGS. 4 at 415), and (9) an ELAPSED TIME for the transaction.

Second table potion 410 includes columns to record (1) a S-IP address for the server, (2) an S-PORT for the server, (3) a C-IP address for the client, (4) a C-PORT for the client, (5) a CS-MIME-TYPE used in the transaction (where MIME means "Multipurpose Internet Mail Extensions"), (6) a CS(Referrer) (e.g., see the Referrer string shown in expanded form at the bottom of FIGS. 4 at 418), and (7) a CS-User-Agent string (e.g., see the User-Agent 1 string shown in expanded form at the bottom of FIG. 4 at 420). In the example of FIG. 4, all of the server-side IP addresses are different, while all of the client-side IP addresses are the same.

Returning to FIG. 3, after HTTP logs 206 have been collected at 305, at 310 NAT detector 204 accesses the logs and identifies each host device therein by its IP address (e.g., client IP address) and/or device/client username. For each host device identified in the logs 206, NAT detector 204 extracts from the logs for the given host device a set of (i.e., multiple) time-varying network traffic behavioral features (also referred to simply as "features") indicative of whether the host device behaves like a NAT device or an end host device. An example set of features extracted from the HTTP logs for the given host device in each time window includes:

a. Number of unique contacted IP addresses;
b. Number of unique User-Agent strings contained in the HTTP transaction (request header);
c. Number of unique operating systems (OSs) including the version as parsed from the User-Agent string;
d. Number of persistent connections (in an example, a connection to an IP address is considered to be persistent if it is active in at least five time windows from ten last consecutive time windows, where the time windows may be set to a time period of 30 minutes, one hour, two hours, or four hours, for example);
e. Number of unique web browser versions as parsed from the User-Agent string;
f. Number of bytes uploaded in the transaction;
g. Number of bytes downloaded in the transaction; and
h. Number of logs/transactions (also referred to as "flows") for the host device in the time window.

The above features (a)-(h) are meant to be examples, only, and more or less features, or even different features, may be extracted from the HTTP logs.

Each feature in the set of features (a)-(h) for each host device takes on feature values that vary over time based on the information recorded in the logs for the given host device. In the example using time windows, NAT detector 204 extracts a feature value for each feature for each host device in each time window based on the HTTP logs for that host device for that time window, such that the feature values vary from window to window as the HTTP logs vary from window to window. The set of feature values (for the features (a)-(h)) for each window for each host device is referred to as a "feature vector" of features values that represents the behavior of the host device and, more specifically, whether the host device behaves more like a NAT device or more like an end host device, as determined by classifier 209.

With reference to FIG. 5, there is an example table of features 500 having columns to record feature values of behavioral features (a)-(h) extracted from logs 206 (i.e., number of unique contacted IP addresses, User-Agent strings, number of OSs, and so on). In one embodiment, each row in table of features 500 represents a set of feature values (i.e., a feature vector) for a different host device. In another embodiment, each row represents a set of feature values (i.e., a feature vector) for a different time window, but for the same host device.

As mentioned above, each feature has feature values that vary over time depending on the relevant information extracted from the HTTP logs. To illustrate this for one feature, reference is now made to FIG. 6, which is an example plot 600 of the average number of flows (i.e., feature (h) listed above) for the given host device per time window. In plot 600, the height of each vertical bar represents the number of flows in a given time window that spans 30 minutes, where all of the time windows collectively span 24 hours.

Returning again to FIG. 3, after the feature value for each feature in each set of features has been extracted in each time window for each host device at 310, at 312, trained classifier 209 classifies each host device as either a NAT device or an end host device based on one or more of the feature values (from corresponding ones of one or more of the time windows) for each feature in the set of features for the given host device. In one embodiment, classifier 209 may classify each host device based on all of the feature values for each feature in the set of features, in which case process flow in method 300 proceeds directly from operation 310 to operation 312.

In another embodiment, classifier 209 may classify each host device based on a subset of the feature values (i.e., one or more, but not all) selected from all of the feature values of each feature in the set of features. Accordingly, method 300 includes optional operations 315 and 320 to select the subset of feature values of each feature in the set of features used by classifier 209 to perform the classify operation 312. In this embodiment, process flow in method 300 proceeds from operation 310 to operation 312 through operations 315 and 320, as described below.

At 315, NAT detector 204 generates/identifies statistics indicative of how the feature values of each feature in each set of features for each host device vary or are distributed over time. Example statistics that may be generated include quantile values, such as a maximum value, a minimum value, and a median value. A further statistic may include a mean value. Feature value-based statistics other than those just described may also be generated.

After the feature statistics have been generated at 315, at 320 NAT detector 204 selects one or more time windows and thus one or more corresponding feature values of each feature of each set of features for each host device based on the statistics generated for that feature. It is desirable to capture/identify the one or more time windows (and thus, feature values) for each host device in which the host device was active and that filters out outlying feature values generated as a result of abnormal host device activities. To achieve this, in an example, NAT detector 204 selects, for each feature, the feature value from a top quarter of quantile values, such as the 90% quantile. It is understood that the 90% quantile is an example only, and other quantiles may be selected.

Figure 6:
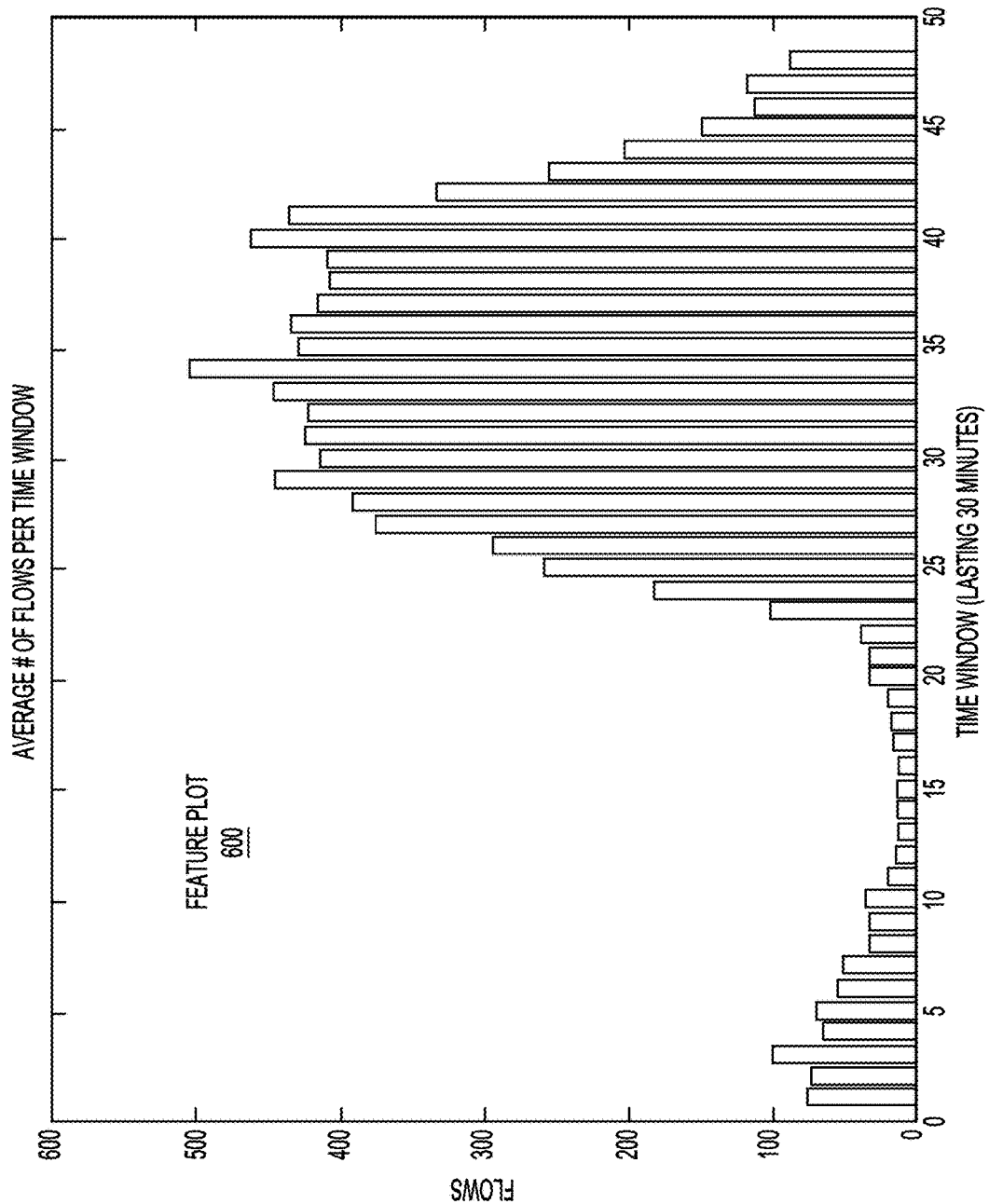
FIG. 6 is a plot that represents the number of flows or network transactions for a given host device per time window, according to an example embodiment.
Figure 7:
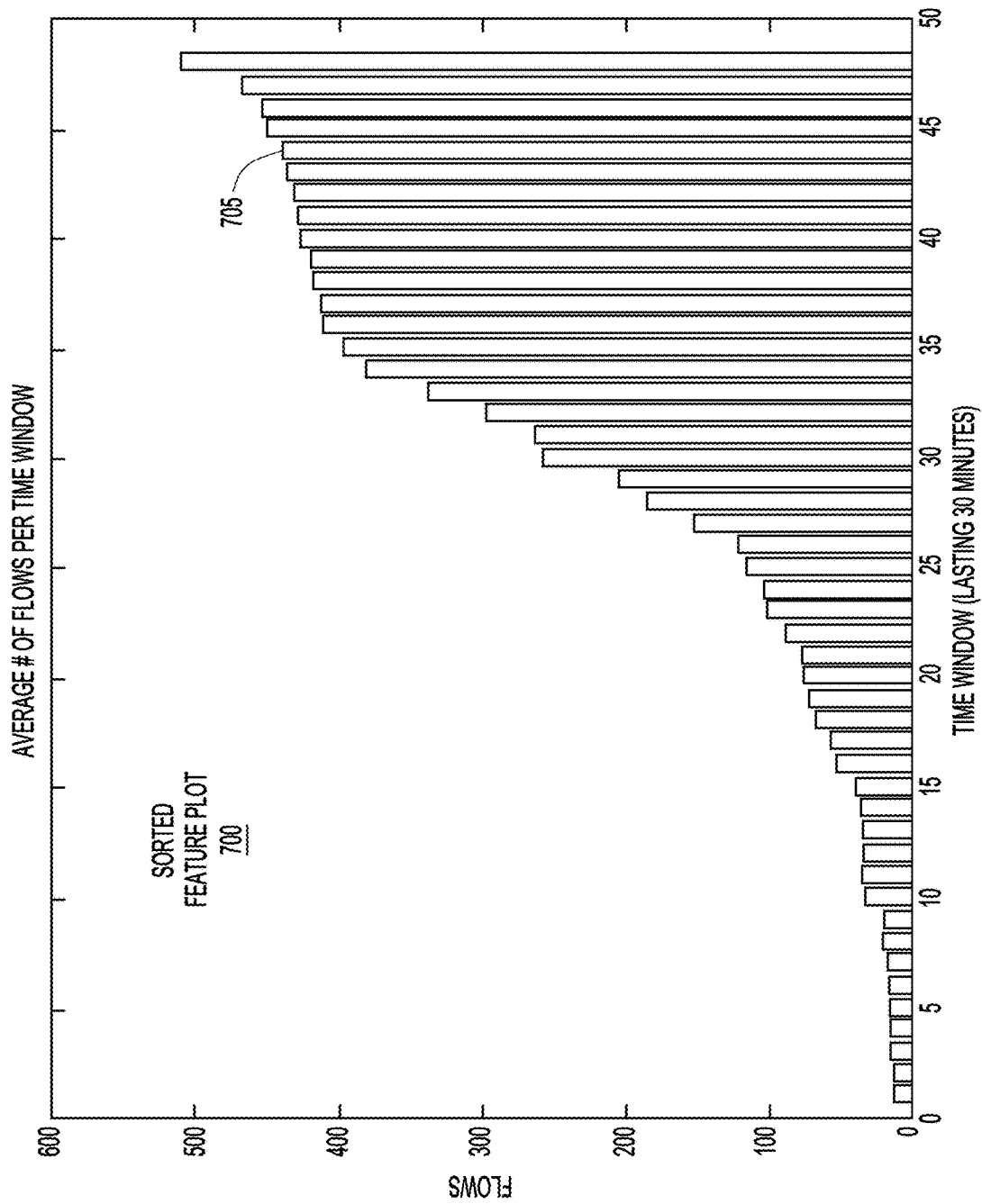
FIG. 7 is a plot that shows the number of flows per time window taken from the plot of FIG. 6 sorted from lowest to highest quantile values across the time windows, according to an example embodiment.

With reference to FIG. 7, there is an example plot 700 that shows the number of flows per time window (i.e., the vertical bars) taken from plot 600 of FIG. 6 sorted from lowest to highest values across the time windows. There is a similar "sorted" plot for each of the features (a)-(h) for each feature of each set of features for each host device. In this example, the 90% quantile is represented by bar 705.

In another embodiment, operation 320 may base the selection of one or more time windows from which feature values are to be used in the classification based on predetermined information defining particular ones of the time windows, i.e., time windows in particular time positions, rather than on generated statistics.

After select operation 320, at 312, trained classifier 209 of NAT detector 204 classifies each host device as either a NAT device or a end host device based on the one or more selected feature values (i.e., the one or more feature vectors) for the set of features for the given host device.

As mentioned above, NAT detection method 300 is performed after classifier 209 has been trained to classify NAT devices and end host user devices. In an embodiment, classifier 209 includes a linear Support Vector Machine (SVM), which is a learning algorithm that learns (i.e., is trained) with real/actual network traffic data; however, to train the SVM, labeled data (i.e., feature vectors) is needed, with end host device/NAT device labels that would indicate that the data is associated with a end host device (i.e., an end host user) or a NAT device (i.e., a host performing NAT). Obtaining such labeled data can be difficult because, typically, there are only a few NAT devices compared to a high number of end host devices in an actual network, which makes the data used to train the classifier highly imbalanced.

Accordingly, embodiments described below create artificial NAT devices for purposes of training the classifier simply by joining network traffic from multiple host devices into a single artificial host device (that represents an artificial NAT device). In this way, an arbitrary number of NAT devices may be simulated with any number of actual host devices, and many different feature vectors may be generated to train the SVM. For purposes of training the SVM, feature vectors for artificially created NAT devices are labeled as "positive samples" and feature vectors for actual host devices are labeled as "negative samples" for the SVM learning machine. This means that feature vectors for any actual NAT devices present in the network are incorrectly labeled as negative samples (which indicate end host devices or ordinary hosts to the classifier); however, it is assumed that the number of actual NAT devices in the network is significantly smaller than the number of actual end host devices (i.e., ordinary hosts). Therefore, incorrect labeling of negative samples for actual NAT devices has a minimal impact on training any classifier supporting noisy data training.

Classifier 209 may be based on or use supervised learning algorithms other than the linear SVM, which is described as an example, only.

Figure 8:
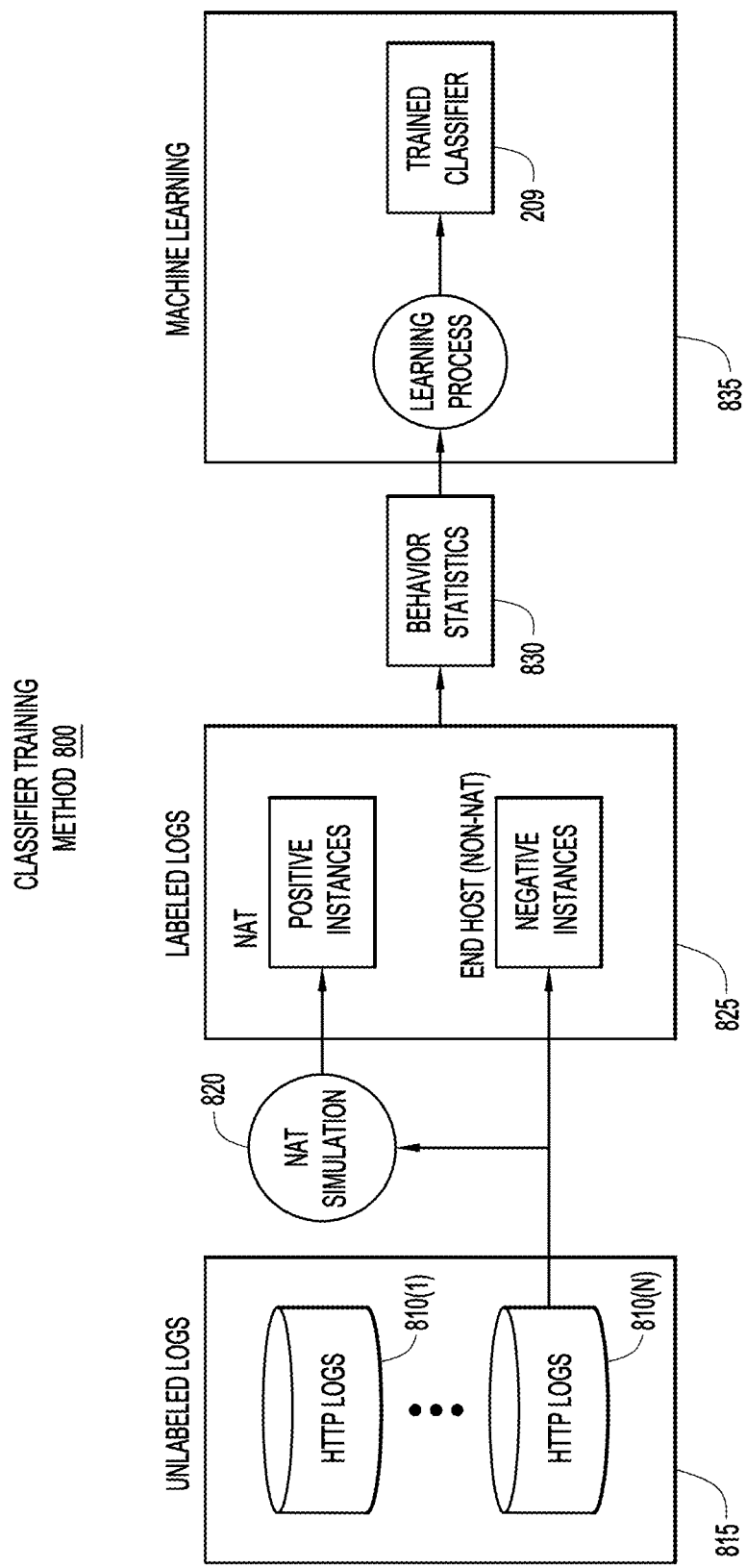
FIG. 8 is a flowchart of a method of training a classifier based on information derived from HTTP logs to transition the classifier from an untrained state to a trained state so that the classifier may be used to classify between a NAT device and an end host device (i.e., a non-NAT device), according to an embodiment.

With reference to FIG. 8, there is a flowchart of an example method 800 of training classifier 209 based on information derived from actual HTTP logs to transition the classifier from an untrained state to a trained state so that the classifier may be used to classify between a NAT device and an end host device, as in method 300.

At 815, multiple sets of actual/real HTTP logs 810(1)-(N) are collected over time for actual/real host devices in one or more networks, which may include, e.g., network 102. The HTTP logs 810 are referred to as known network traffic logs for purposes of training. The number of actual host devices typically includes a number of actual end host devices and a number of actual NAT devices. Each log in actual HTTP logs 810 is labeled to indicate end host device behavior, i.e., to indicate an end host device. The labeled actual HTTP logs are referred to as negative samples or negative instances because they are assumed not to indicate NAT devices.

At 820 (referred to as "NAT simulation"), artificial HTTP logs for a number of artificial NAT devices are created based on actual HTTP logs 810 in the following manner:

a. The artificial NAT devices are created, each identified by a corresponding IP address. Each IP address may be an IP address in actual HTTP logs 810 that identifies an actual host device or an artificially created IP address. The number of artificial NAT devices is arbitrary. In one embodiment, the number of artificial NAT devices is equal to the number of actual host devices identified in the actual HTTP logs 810. In other embodiments, the number of artificial NAT devices is less than or greater than the number of actual host devices identified in actual HTTP logs 810;

b. For each artificial NAT, multiple artificial HTTP logs are created from a corresponding set of actual HTTP logs for different actual host devices in the following manner. The set of actual HTTP logs are copied, and each HTTP log in the copied set of actual HTTP logs is associated with the given artificial NAT device instead of the different actual host devices. To do this, the different IP addresses of the different host devices in the set of copied actual HTTP logs are all replaced with the IP address of the given artificial NAT device. This creates a set of artificial HTTP logs for the given artificial NAT in addition to the original actual HTTP logs that were copied; and c. Each artificial log in the artificial HTTP logs is labeled to indicate NAT device behavior, i.e., to indicate a NAT device. The labeled artificial HTTP logs are referred to as positive samples or positive instances because they indicate NAT devices.

At 825, the labeled actual HTTP logs (i.e., negative instances) and the labeled artificial HTTP logs (i.e., positive instances) from 820 are merged into a file of labeled HTTP logs representative of both NAT devices (the positive instances) and end host devices (the negative instances).

At 830, operations 310 and, optionally, operations 315 and 320, described above are performed across the merged HTTP logs to generate one or more feature values for each feature of the set of features for each host device identified in the merged HTTP logs (i.e., for assumed end host devices and the artificial NAT devices). The feature values generated at 830 are labeled (i.e., indicated as positive and negative instances) according to the manner in which the HTTP logs from which the feature values were extracted are labeled.

At 835, classifier 209 implements a learning process to learn, or train, to classify between an end host device (i.e., an end host user) and a NAT device based on the labeled feature values from operation 830. In other words, classifier 209 trains based on the labeled HTTP logs so as to transition itself from an untrained state to a trained or learned state.

Figure 9:
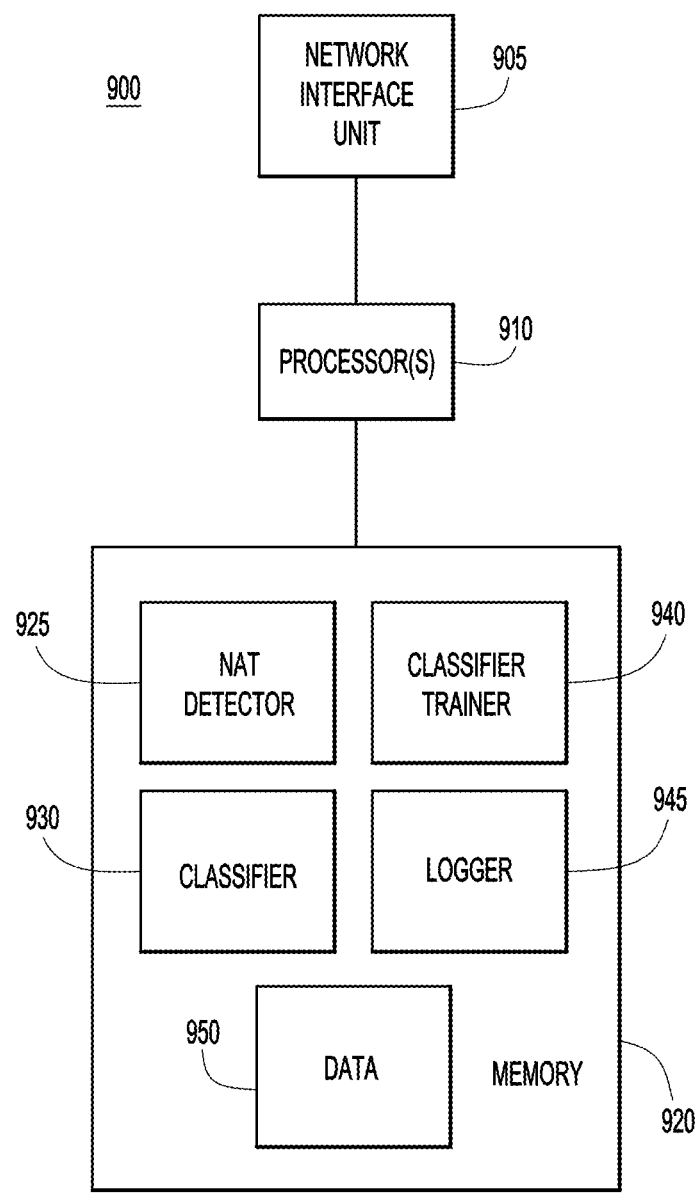
FIG. 9 is a block diagram of a computer system configured to perform the methods presented herein, according to an embodiment.

With reference to FIG. 9, there is depicted a block diagram of a computer system 900 to perform the methods presented herein. Computer system 900 may be part of any device in network 102, for example, proxy server 108, host devices A-E, NAT device 112, or switch device 110. Computer system 900 may also be a stand-alone system that accesses the HTTP logs from proxy server 108 to perform the methods described above. Computer system 900 includes a network interface unit 905 configured to enable network communications to send messages to and receive messages from devices in a network (e.g., devices in network 102). One or more processors 910 are provided that execute software stored in memory 920. Processor(s) 910 include, for example, one or more microprocessors and/or microcontrollers. To this end, the memory 920 stores instructions for software stored in the memory that are executed by processor(s) 910 to perform the methods described herein.

Memory 920 may comprise read only memory (ROM), random access memory (RAM), magnetic disk storage media devices, optical storage media devices, flash memory devices, electrical, optical, or other physical/tangible memory storage devices. Thus, in general, the memory 920 may comprise one or more tangible (non-transitory) computer readable storage media (e.g., a memory device) encoded with software comprising computer executable instructions and when the software is executed (by the processor(s) 910) it is operable to perform the operations described herein. Memory 920 may store NAT detector logic 925 to implement NAT detector 204 that performs NAT detection methods described in connection with FIGS. 2 and 3, classifier logic 930 to implement classifier 209 described above, classifier trainer logic 940 to implement the classifier training method described in connection with FIG. 8, and logger logic 945 to record network traffic as HTTP logs.

In addition, memory 920 stores data 950 used and generated by the processor 910 when executing the logic described above.

In summary, a NAT (or HTTP proxy) detection algorithm uses multiple features (e.g., 8 features) extracted from HTTP logs of network traffic which are collected in consecutive non-overlapping time windows of a predefined duration. In an embodiment, one or more representative feature values of each feature are selected, although all of the feature values may be used. For the purpose of training linear SVM on balanced data, artificial NAT devices are constructed by merging artificial logs with real/actual logs. Finally, host devices of any network are classified using the pre-trained linear SVM, but other classifiers can be used as well. The techniques described herein: only need HTTP logs to detect NAT hosts; provide a high accuracy of NAT detection; provide a capability to detect NAT devices with users having the same OS and web browser; provides a behavior classifier that is well trained on a sufficient amount and variety of positive and negative samples; and provides a good estimate of the actual number of users in a network.

In summary, in one form, a method is provided comprising: collecting actual traffic logs of network traffic to and from host devices in a network; generating, from the actual traffic logs, artificial traffic logs for each of multiple artificial network address translation (NAT) devices; labeling the actual traffic logs and the artificial traffic logs as being indicative of non-NAT devices that do not perform NAT and NAT devices, respectively, to produce labeled traffic logs; extracting from the labeled traffic logs for each artificial NAT device and each non-NAT device respectively, correspondingly labeled, network traffic features indicative of whether the device behaves like a NAT device or a non-NAT device; and training a classifier device using the respective, correspondingly labeled, network traffic features extracted for each artificial NAT device and each non-NAT device to classify between an actual NAT device and an actual non-NAT device based on further actual traffic logs.

In summary, in another form, an apparatus is provided comprising: a network interface unit configured to communicate with a network; and a processor, coupled to the network interface unit, and configured to: collect actual traffic logs of network traffic to and from host devices in a network; generate, from the actual traffic logs, artificial traffic logs for each of multiple artificial network address translation (NAT) devices; label the actual traffic logs and the artificial traffic logs as being indicative of non-NAT devices that do not perform NAT and NAT devices, respectively, to produce labeled traffic logs; extract from the labeled traffic logs for each artificial NAT device and each non-NAT device respectively, correspondingly labeled, network traffic features indicative of whether the device behaves like a NAT device or a non-NAT device; and train a classifier device using the respective, correspondingly labeled, network traffic features extracted for each artificial NAT device and each non-NAT device to classify between an actual NAT device and an actual non-NAT device based on further actual traffic logs.

In summary, in yet another form, a non-transitory computer readable storage medium is encoded with instructions that, when executed by a processor, cause the processor to perform: collecting actual traffic logs of network traffic to and from host devices in a network; generating, from the actual traffic logs, artificial traffic logs for each of multiple artificial network address translation (NAT) devices; labeling the actual traffic logs and the artificial traffic logs as being indicative of non-NAT devices that do not perform NAT and NAT devices, respectively, to produce labeled traffic logs; extracting from the labeled traffic logs for each artificial NAT device and each non-NAT device respectively, correspondingly labeled, network traffic features indicative of whether the device behaves like a NAT device or a non-NAT device; and training a classifier device using the respective, correspondingly labeled, network traffic features extracted for each artificial NAT device and each non-NAT device to classify between an actual NAT device and an actual non-NAT device based on further actual traffic logs.

The above description is intended by way of example only. Various modifications and structural changes may be made therein without departing from the scope of the concepts described herein and within the scope and range of equivalents of the claims.

What is claimed is:

1. A method comprising: at a computer system including classifier training logic: collecting, over time, actual traffic logs of network traffic to and from host devices in a network; generating, from the actual traffic logs, artificial traffic logs for each of multiple artificial network address translation (NAT) devices; labeling the actual traffic logs and the artificial traffic logs as being indicative of non-NAT devices that do not perform NAT and NAT devices, respectively, to produce labeled traffic logs; extracting from the labeled traffic logs for each artificial NAT device and each non-NAT device, respective, correspondingly labeled, network traffic features each having values indicative of whether the device behaves like a NAT device or a non-NAT device, and that vary over time with the actual traffic logs collected from the network; and training a classifier device using the respective, correspondingly labeled, network traffic features extracted for each artificial NAT device and each non-NAT device to classify between an actual NAT device and an actual non-NAT device based on subsequently obtained actual traffic logs.

2. The method of claim 1, wherein the generating the artificial traffic logs for each artificial NAT device includes:
copying actual traffic logs associated with different ones of the host devices, to produce copied actual traffic logs; and associating each copied actual traffic log with the artificial NAT device instead of the different ones of the host devices, to produce the artificial traffic logs for the artificial NAT device in addition to the actual traffic logs for the different ones of the host devices.

3. The method of claim 2, wherein:
the copied actual traffic logs identify the different ones of the host devices by different respective Internet Protocol (IP) addresses; and
the associating includes replacing each of the different respective IP addresses with an IP address of the artificial NAT device.

4. The method of claim 1, wherein the respective, correspondingly labeled, network traffic features include at least two of: a number of contacted unique Internet Protocol (IP) addresses indicated in the labeled traffic logs; a number of User-Agent strings included in packet headers; and a number of persistent connections.

5. The method of claim 1, wherein the collecting the actual traffic logs includes collecting actual traffic logs identifying host devices that are NAT devices and host devices that are non-NAT devices.

6. The method of claim 1, wherein:
the collecting further includes collecting the actual traffic logs over time in consecutive non-overlapping time windows; and
the extracting further includes extracting the respective, correspondingly labeled, network traffic features such that each network traffic feature has a respective value in each time window.

7. An apparatus comprising: a network interface unit configured to communicate with a network; and a hardware processor, coupled to the network interface unit, and configured to: collect, over time, actual traffic logs of network traffic to and from host devices in a network; generate, from the actual traffic logs, artificial traffic logs for each of multiple artificial network address translation (NAT) devices; label the actual traffic logs and the artificial traffic logs as being indicative of non- NAT devices that do not perform NAT and NAT devices, respectively, to produce labeled traffic logs; extract, from the labeled traffic logs for each artificial NAT device and each non- NAT device, respective, correspondingly labeled, network traffic features each having values indicative of whether the device behaves like a NAT device or a non-NAT device, and that vary over time with the actual traffic logs; and train a classifier device using the respective, correspondingly labeled, network traffic features extracted for each artificial NAT device and each non-NAT device to classify between an actual NAT device and an actual non-NAT device based on subsequently obtained actual traffic logs.

8. The apparatus of claim 7, wherein processor is configured to generate the artificial traffic logs for each artificial NAT device by:
copying actual traffic logs associated with different ones of the host devices, to produce copied actual traffic logs; and
associating each copied actual traffic log with the artificial NAT device instead of the different ones of the host devices, to produce the artificial traffic logs for the artificial NAT device in addition to the actual traffic logs for the different ones of the host devices.

9. The apparatus of claim 8, wherein the copied actual traffic logs identify the different ones of the host devices by different respective Internet Protocol (IP) addresses, and the processor is configured to associate by replacing each of the different respective IP addresses with an IP address of the artificial NAT device.

10. The apparatus of claim 7, wherein the respective, correspondingly labeled, network traffic features include at least two of: a number of contacted unique Internet Protocol (IP) addresses indicated in the labeled traffic logs; a number of User-Agent strings included in packet headers; and a number of persistent connections.

11. The apparatus of claim 7, wherein the processor is configured to collect by collecting actual traffic logs identifying host devices that are NAT devices and host devices that are non-NAT devices.

12. The apparatus of claim 7, wherein the processor is further configured to:
collect by collecting the actual traffic logs over time in consecutive non-overlapping time windows; and
extract by extracting the respective, correspondingly labeled, network traffic features such that each network traffic feature has a respective value in each time window.

13. The apparatus of claim 10, wherein the network traffic features further include a number of unique operating systems, a number of web browser versions, and at least one of a number of bytes uploaded and a number of bytes downloaded.

14. A non-transitory computer readable storage medium encoded with instructions that, when executed by a processor, cause the processor to perform:
collecting, over time, actual traffic logs of network traffic to and from host devices in a network;
generating, from the actual traffic logs, artificial traffic logs for each of multiple artificial network address translation (NAT) devices;
labeling the actual traffic logs and the artificial traffic logs as being indicative of non-NAT devices that do not perform NAT and NAT devices, respectively, to produce labeled traffic logs;
extracting, from the labeled traffic logs for each artificial NAT device and each non-NAT device, respective, correspondingly labeled, network traffic features each having values indicative of whether the device behaves like a NAT device or a non-NAT device, and that vary over time with the actual traffic logs; and
training a classifier device using the respective, correspondingly labeled, network traffic features extracted for each artificial NAT device and each non-NAT device to classify between an actual NAT device and an actual non-NAT device based on subsequently obtained actual traffic logs.

15. The non-transitory computer readable storage medium of claim 14, wherein the instructions to cause the processor to perform generating the artificial traffic logs for each artificial NAT device include instructions to cause the processor to perform:
copying actual traffic logs associated with different ones of the host devices, to produce copied actual traffic logs; and
associating each copied actual traffic log with the artificial NAT device instead of the different ones of the host devices, to produce the artificial traffic logs for the artificial NAT device in addition to the actual traffic logs for the different ones of the host devices.

16. The non-transitory computer readable storage medium of claim 15, wherein:

the copied actual traffic logs identify the different ones of the host devices by different respective Internet Protocol (IP) addresses; and the instructions to cause the processor to perform the associating include instructions to cause the processor to perform replacing each of the different respective IP addresses with an IP address of the artificial NAT device.

17. The non-transitory computer readable storage medium of claim 14, wherein the respective, correspondingly labeled, network traffic features include at least two of: a number of contacted unique Internet Protocol (IP) addresses indicated in the labeled traffic logs; a number of User-Agent strings included in packet headers; and a number of persistent connections.

18. The non-transitory computer readable storage medium of claim 14, wherein the instructions to cause the processor to perform the collecting the actual traffic logs include instructions to cause the processor to perform collecting actual traffic logs identifying host devices that are NAT devices and host devices that are non-NAT devices.

19. The non-transitory computer readable storage medium of claim 14, wherein:

the instructions to cause the processor to perform the collecting include instructions to cause the processor to perform collecting the actual traffic logs over time in consecutive non-overlapping time windows; and the instructions to cause the processor to perform the extracting include instructions to cause the processor to perform extracting the respective, correspondingly labeled, network traffic features such that each network traffic feature has a respective value in each time window.

20. The non-transitory computer readable storage medium claim 17, wherein the network traffic features further include a number of unique operating systems, a number of web browser versions, and at least one of a number of bytes uploaded and a number of bytes downloaded.

* * * * *